United States Patent [19]

Frese et al.

[11] 3,839,190

[45] Oct. 1, 1974

[54] PROCESS FOR THE PRODUCTION OF BITUMEN OR BITUMEN-CONTAINING MIXTURES WITH IMPROVED PROPERTIES

[75] Inventors: Albert Frese, Marl; Helmut Christofzik, Herten, both of Germany

[73] Assignee: Chemische Werke Huels Aktiengesellschaft, Marl, Germany

[22] Filed: Feb. 21, 1973

[21] Appl. No.: 334,453

Related U.S. Application Data

[63] Continuation-in-part of Ser. No. 83,196, Oct. 22, 1970, abandoned.

[30] Foreign Application Priority Data

Oct. 25, 1969 Germany............................ 1953827

[52] U.S. Cl.................... 208/44, 208/6, 208/22, 106/274
[51] Int. Cl.............................................. C10c 3/02
[58] Field of Search............ 208/44, 22, 6; 106/274

[56] References Cited

UNITED STATES PATENTS

| 1,711,449 | 4/1929 | Cunningham...................... 106/274 |
| 2,299,469 | 10/1942 | D'Antal............................. 106/274 |
| 3,509,038 | 4/1970 | Corbett.............................. 208/22 |

OTHER PUBLICATIONS

Herbert Abraham, Asphalts and Allied Substances, Vol. 3, New York, Van Nostrand Co., Inc., pp. 25–26, 1962.

*Primary Examiner*—Veronica O'Keefe
*Attorney, Agent, or Firm*—Millen, Raptes & White

[57] ABSTRACT

The softening point of bitumens having softening points of up to 120° C. is raised without adversely affecting rupturing point and other properties by heating the bitumen at a temperature above the softening point of up to 150° C. for up to 30 minutes with either sulfuric acid or a metal halide selected from the group consisting of $TiCl_4$, $AlCl_3$, $VOCl_3$, $VCl_4$ and $ZrCl_4$.

18 Claims, No Drawings

PROCESS FOR THE PRODUCTION OF BITUMEN OR BITUMEN-CONTAINING MIXTURES WITH IMPROVED PROPERTIES

BACKGROUND OF THE INVENTION

This invention relates to a process for the production of bitumen or bitumen-containing mixtures with improved properties. This is a continuation-in-part of application S.N. 83,196 filed Oct. 22, 1970 now abandoned.

Bitumens, also known as bitumina, asphalt-containing petroleum residuums and asphaltic flux, are the asphaltic, non-distillable residues of crude oil refining. Except for the well-known blowing technique for increasing softening points and the pyrophoric changes which occur during refining, conventional bitumens are chemically unmodified. Depending on their source in the refining process, they are known as primary bitumens, high-vacuum bitumens, bituminous blends, bituminous coal tars, which are chemically unmodified, and blown bitumens, which have been exposed while hot to the oxidizing effect of a stream of air. It is this class of non-distillable residues, viz., chemically unmodified and blown bitumens, which are the starting materials for the process of this invention.

For various uses, e.g., to produce roofing boards, for sealing compounds and insulating compositions, and for road-surfacing materials, bitumens are required having higher softening points than primary bitumens, but whose rupture point is unchanged, if at all possible, and which have relatively high penetration, i.e., indentation hardness values. Primary bitumens, e.g., B 300 and B 200, have softening points of about 20°–40° C. Blown bitumens, such as bituman 75/30, have higher softening points, e.g., about 75° C.

It is highly desirable to increase the softening point of bitumens, if possible without a simultaneous increase in the rupturing (breaking) point.

It is known from German Patent 1,180,083 to blow bitumen with oxygen of air, in the presence of certain phosphoric acids, at a throughput of 9–80 m³ of air per ton of bitumen at 150°–300° C., for a period of 6-10 hours. However, blown bitumens with conventional properties are obtained in this manner, and high temperatures and long reaction times must be tolerated.

U.S. Pat. No. 1,711,449 and U.S. Pat. No. 2,299,469 disclose high temperature treatment of bitumens with sulfuric acid. Such a process is relatively expensive because of the amount of heat energy and pressure vessels required for the process. Also, the evolution of $SO_2$ is undesirable and the improvement in softening point is less than optimum.

Corbett, U.S. Pat. No. 3,509,038, discloses a process for the treatment of bitumens enploying a tri-component reagent consisting of an aldehyde as a coupling agent in combination with a metal halide plus a halogen, sulfuric acid, or a halide or oxide of sulfur or phosphorous, thus departing from the simple and inexpensive sulfuric conditions employed by D'Antal, U.S. Pat. No. 2,299,469.

The process of this invention is an improvement in the processes for the treatment of bitumens to improve the properties thereof.

OBJECTS OF THE INVENTION

It is an object of this invention to provide a novel process for increasing the softening point of bitumens. It is another object to provide such a process which does not require blowing the bitumen. It is a further object to provide such a process which requires less thermal treatment of the bitumen than employed in a conventional blowing operation. Other objects will be apparent to those skilled in the art to which this invention pertains.

SUMMARY OF THE INVENTION

According to this invention, the softening point of a chemically unmodified or blown bitumen having a softening point of up to 120° C. is raised by treating the bitumen with sulfuric acid or a metal halide selected from the group consisting of $TiCl_4$, $AlCl_3$, $VOCl_3$, $VCl_4$ and $ZrCl_4$, for up to 30 minutes at a temperature above its softening point of up to 150° C.

DETAILED DISCUSSION

Bitumens which can be treated in the process of this invention are primary bitumens, B 300 (34° C.), B 200 (39°–40° C), B 80, B 65, B 45, B 25 and B 15; blown bitumens, e.g., 75/30, 85/40, 105/15, 115/15 and 135/10, high vacuum bitumens, e.g., HVB 85/95, 95/105, 130/140 and blends thereof, e.g., BV 500. Chemically unmodified crude bitumens, distillation tars, and distillation residues from petroleum distillation, and blends of bitumens having lower setting points, i.e., inexpensive bitumens and bitumen-containing products, are of special interest, because their properties after treatment according to this invention are about as good as or better than those of the substantially more expensive blown bitumens.

The starting bitumens are chemically unmodified, i.e., primary or high vacuum bitumens or blown bitumens, having a softening point of up to 120° C. Preferred starting bitumens are those having a softening point below 90° C. Especially preferred are those having a softening point below 45° C.

The additives are employed in an amount effective to increase the softening point (DIN 1995) of the starting bitumen, e.g., from 0.5–20 percent, preferably 5 – 10 percent by weight. The exact amount which should be employed will depend on the agent selected to improve the properties of the bitumen and the degree of improvement desired in the final product.

The sulfuric acid is preferably employed in high concentrated form, e.g., at least 90 percent, preferably 95 to 98,5 percent.

The reaction, which can be conducted continuously or batch-wise, is conducted at temperatures above the softening point of the starting bitumen, e.g., 20°–150° C., usually 60°–150° C., preferably at 100°–150° C., more preferably between 140° and 150° C. The higher temperatures within this range facilitate the mixing and discharging procedures, by lowering the viscosity of the bitumen, especially in case of starting or final bitumens having relatively high softening points. However, above 150° C. a loss in properties of the bitumen can occur.

The reaction is continued until the desired increase in softening point is achieved, up to about 30 minutes, preferably up to 10 minutes, e.g., 1–6 minutes for sulfuric acid and about 5–10 minutes for the metal halides. This brief heating time at relatively low temperatures makes the process economically attractive. Longer heating times and/or higher temperatures cause a degradation of the treated bitumen.

The additives are advantageously added under agitation, e.g., in heatable mixers to ensure uniform distribution throughout the bitumen. It is, however, possible to treat the starting bitumen or the bitumen-containing mixture by coating the surface thereof.

The process of this invention effects an increase in the softening point, e.g., from 5°–100° or more, with the preferred bitumens at optimum concentrations a marked increase can be achieved, e.g., from 40° to 100°. Other property values of the bitumens, for example rupture point, are not adversely affected and some improvement thereof is sometimes effected. The improved bitumens produced in accordance with this invention thus combine the favorable property values of several bitumen qualities in a single formulation.

Surprisingly, bitumens treated according to this invention retain their increased softening points when subsequently treated at higher temperatures with water, steam, a sodium hydroxide solution or a soda solution, which is evidence the treated bitumen will not incur any substantial degradation change in their improved property values, under normal atmospheric conditions, even over a longer period of time than conventional bitumens. For example, bitumen 200 treated with 8 percent by weight of concentrated sulfuric acid retains its increased softening point of 120° C. when stirred with the same volume of water for two hours at 120° C.

By adding varying amounts of the above-mentioned additives, the softening point can be adjusted to the desired level, up to the maximum increase possible with the selected additive and starting bitumen. It is also possible to mix these treated bitumens having higher softening points with bitumens of lower softening points, e.g., untreated bitumens, in order to obtain products having intermediate softening points. This has the advantage of not requiring termination of the treatment before maximum increase in softening temperature is achieved at the selected conditions.

The improvement in properties of bitumens according to this invention could not be foreseen since it was known that bitumen is resistant to dilute acids, and was attacked by concentrated acids ("Ullmanns Enzyklopaedie der technischen Chemie" [Ullmann's Encyclopedia of Technical Chemistry], Vol. 4, 415 [1953]), because an "attack" has the effect of a decomposition of the material usually or it makes the material hydrophilic, but it does not change the properties in the desired direction. In accordance with this, "Ullmann" does not cite the treatment with concentrated acids among the processes which have technical importance.

The novel process is particularly surprising in view of the state of the art represented by German Pat. No. 1,180,083 because it could not be foreseen that blowing with oxygen is unnecessary in order to effect a catalytic improvement. It especially could not be expected that this improvement would be achieved at a much lower temperature and within a very short period of time. It is also surprising that the brittle point of the bitumens is hardly changed, and even sometimes lowered according to this invention, so that bitumens are obtained having a substantially broader processing and use temperature range. Finally, the process of this invention can also be conducted at such low temperatures that aqueous additives can be employed without incurring the troublesome foam formation which occurs during blowing at higher temperatures.

The determination of the softening points (ring and ball), the brittle points (according to Fraass), and the penetration was conducted according to German Industrial Standard DIN 1995 (1960 edition).

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

The amount of additive employed is percent by weight.

EXAMPLE 1

100 g. of bitumen B 200 with a softening point of 40° C. is heated to 120° C. After adding the amount of titanium tetrachloride set forth in the table below, the temperature is increased, under agitation within six minutes, to 140° to 150° C. in order to maintain the bitumen in a stirrable condition. Thereafter, the bitumen is cooled to room temperature.

| Additive | Softening Point |
| --- | --- |
| — | 42° C. |
| 0.5 % $TiCl_4$ | 44° C. |
| 1.0 % $TiCl_4$ | 48° C. |
| 2.0 % $TiCl_4$ | 60° C. |
| 5.0 % $TiCl_4$ | 86° C. |
| 10.0 % $TiCl_4$ | 135° C. |

If, in place of titanium tetrachloride, 10 percent by weight of the non-acidic tetrabutyl titanate, a lowering to 29° C. rather than an increase in the softening point is obtained.

Following the procedure of Example 1, employing 10 percent $TiCl_4$, the treatment time and temperature were varied to determine the affect of these variables on the properties of the treated bitumen. The results are set forth below:

| Treatment Time Min. | Treatment Temp. °C. | Softening Point (Ring & Ball) °C. |
| --- | --- | --- |
| 1 | 60 | 107 |
| 1 | 80 | 107 |
| 1 | 100 | 108 |
| 1 | 120 | 110 |
| 1 | 140 | 112 |
| 5 | 60 | 132 |
| 5 | 80 | 130 |
| 5 | 100 | 134 |
| 5 | 120 | 133 |
| 5 | 140 | 135 |
| 7 | 60 | 134 |
| 7 | 80 | 132 |
| 7 | 100 | 134 |
| 7 | 120 | 135 |
| 7 | 140 | 135 |
| 30 | 60 | 95 |
| 30 | 80 | 88 |
| 30 | 100 | 86 |
| 30 | 120 | 82 |
| 30 | 140 | 78 |

These experiments show clearly the optimum treatment time to be 5–7 minutes. No advantage was realized by heating this bitumen above 60° C. and, when the bitumen was heated for 30 minutes, poorer results were obtained.

Similar results were obtained in comparative experiments with additions of 5 percent and 10 percent $H_2SO_4$. When adding sulfuric acid, the optimum values are reached within one minute. In cases where sulfuric acid is added, the treatment time ideally would be below one minute, but with shorter heating times, uniform intermixing is difficult to achieve. A marked loss in properties occurs if the bitumen is heated to 180° C.

| Treatment Time Min. | Treatment Temp. °C. | Softening Point (Ring & Ball) °C. |
|---|---|---|
| 5% $H_2SO_4$ Addition | | |
| 1 | 60 | 94 |
| 1 | 80 | 95 |
| 1 | 100 | 94 |
| 1 | 120 | 95 |
| 1 | 140 | 95 |
| 6 | 80 | 95 |
| 6 | 120 | 95 |
| 30 | 80 | 90 |
| 30 | 140 | 87 |
| 30 | 180 | 74 |
| 10% $H_2SO_4$ Addition | | |
| 1 | 60 | 138 |
| 6 | 60 | 140 |
| 1 | 100 | 141 |
| 6 | 100 | 139 |
| 1 | 120 | 140 |
| 6 | 120 | 142 |
| 30 | 120 | 124 |
| 1 | 150 | 142 |
| 6 | 150 | 142 |
| 1 | 180 | 121 |
| 6 | 180 | 113 |
| 30 | 180 | 92 |
| The same effect was also observed with 10% $AlCl_3$. | | |
| 1 | 80 | 97 |
| 1 | 120 | 98 |
| 1 | 140 | 101 |
| 5 | 80 | 104 |
| 5 | 120 | 104 |
| 5 | 140 | 105 |
| 10 | 80 | 105 |
| 10 | 120 | 107 |
| 10 | 140 | 106 |
| 6 | 150 | 107 * |
| 6 | 180 | 107 ** |

* homogeneous
** heterogeneous (106–117)

EXAMPLE 2

According to the procedure described in Example 1, 100 g. of bitumen B 200 is reacted with 10 percent of concentrated sulfuric acid. There is obtained a bitumen having a softening point of 145° C. Treatment with 200 cc. of 5 percent sodium hydroxide solution at 120° C. (two hours), lowers the softening point only to 137° C.

By the addition of 9 percent of sulfuric acid, a bitumen is obtained having a softening point of 135° C. The softening point does not change after a two-hour treatment with 200 g. of 5 percent soda solution at 120° C.

Using 8 percent of sulfuric acid, a bitumen is produced having a softening point of 115° C. This product is then treated for two hours under agitation with the same amount of water at 120° C. After this treatment, the bitumen exhibits a softening point of 120° C. No sulfuric acid can be detected in the treated bitumen in water by titration with N/10 sodium hydroxide.

For comparison purposes, the same bitumen is first heated to 120° C. in accordance with the procedure of Example 1, in the absence of additive. Thereafter the temperature is increased within six minutes to 140 to 150° C. A bitumen is obtained having a softening point of 43° C. This product, when stirred for two hours with the same amount of water at 120° C., thereafter exhibits a softening point of 63° C.

The sodium hydroxide solution and sodium carbonate solutions employed to test the stability of the treated bitumen do not have a favorable effect on the properties of the bitumen. The addition of 10 percent of 50 percent sodium hydroxide solution to bitumen B 200 according to the procedure of Example 1 does not change its softening point. The addition of 10 percent of 20 percent soda solution by the same procedure lowers the softening point from 40° C. to 36° C. The same results are obtained by the addition of anhydrous sodium hydroxide and anhydrous sodium carbonate.

EXAMPLE 3

Bitumen B 200 is treated according to procedure of Example 1 with 10 percent of the additives set forth in the table. After cooling, the softening points (ring and ball) of the treated bitumen are measured.

| Additive | Softening Point ° C. |
|---|---|
| $H_2SO_4$ | 145° C. |
| $TiCl_4$ | 135° C. |
| $AlCl_3$ | 106° C. |
| $VOCl_3$ | 104° C. |
| $VCl_4$ | 99° C. |
| $ZrCl_4$ | 92° C. |
| Comparison Additives | |
| $SnCl_4$ | 87° C. |
| $ZnCl_2$ | 85° C. |
| $TiCl_3$ | 79° C. |
| $FeCl_3$ | 72° C. |
| (20% aqueous solution) | |
| S | 67° C. |
| $SO_2Cl_2$ | 62° C. |
| $SbCl_3$ | 60° C. |
| $SbCl_5$ | 60° C. |
| $Br_2$ | 60° C. |
| $BF_3$ (Etherate) | 58° C. |
| $H_3PO_4$ | 57° C. |
| $Al_2(SO_4)_3$ | 52° C. |
| $SOCl_2$ | 51° C. |

As can be seen from a comparison of the softening points, the inorganic salts of this invention, exhibit a more favorable effect on the softening point than other inorganic metal salts, bromine and sulfur. Acids also have a more favorable effect than the acid chlorides. Phosphoric acid and organic acids, e.g., lactic acid and tartaric acid, as well as alkali and alkaline earth salts thereof, exhibit a much less favorable effect (softening points of 45°–46° C.) than sulfuric acid. Organic acid chlorides even lower the softening point. For example, acetyl chloride lowers the softening point to 36° C., and benzoyl chloride reduces it to 26° C.

To determine the effect on the properties of bitumen of heating at an excessive temperature in the presence of acidic additives, following the procedures of Examples 2 and 3, bitumen B 200, having a softening point of 40° C. and a penetration value of 200, was heated with 10 percent $AlCl_3$ or concentrated sulfuric acid as additive. After adding the AlCl₃ or the sulfuric acid, the temperature was increased with agitation within 6 minutes to 150° C. with one sample and 180° C. with another identical sample. The samples were then cooled and tested for penetration and softening point. The results of this testing are set forth below.

| Sample | | Softening Point | Penetration Value |
| --- | --- | --- | --- |
| Ia | heated to 150° C. with AlCl₃ | 107° C. | 8 – 9 |
| Ib | heated to 180° C. with AlCl₃ | 107° C. (values differing between 106 and 117° C.) | 8 – 17 |
| IIa | heated to 150° C. with H₂SO₄ | 142° C. | 24 – 25 |
| IIb | heated to 180° C. with H₂SO₄ | 113° C. | 45 – 51 |

The bitumen sample heated to 150° C. with AlCl₃ (Ia) was homogeneous and exhibited a smooth, glossy surface. In contrast thereto, the sample heated to 180° C. (Ib) was surprisingly non-homogeneous. It exuded an oily substance and contained solid areas in which the softening point and the penetration value varied. The surface of the sample was matte and uneven.

Sample IIa was homogeneous and exhibited a smooth, glossy surface whereas sample IIb had an uneven surface and formed bubbles. During heating between 150° and 180° C., the sample solidified temporarily and became fluid afterwards. Above 150° C., a striking evolution of sulfur dioxide was observed. The samples heated at 150° C. exhibited no SO₂ evolution. Sample IIb had a considerably lowered softening point, compared with sample IIa. Also, the penetration values of sample IIb are extremely low.

EXAMPLE 4

Bitumen B 200 is mixed at 120° C. within 5 minutes with 5 percent of zirconium tetrachloride. After cooling, the softening point of the treated bitumen is 95° C. The brittle point is −14° C., which is practically unchanged from that of the untreated bitumen. The penetration is 20–30.

By the addition of 5 percent by weight of concentrated sulfuric acid under the same conditions, an improved bitumen is obtained which likewise exhibits a softening point of 95° C., a brittle point of −12° C., and a penetration of 34–40. Compared to the customary bitumen qualities, the products of the process of this invention are substantially improved. According to its penetration value, the improved bitumen would correspond to a bitumen quality of B 45 which however, exhibits substantially less favorable softening points and brittle points.

| | Bitumen B 45 | Bitumen B 200 Treated with 5% of H₂SO₄ |
| --- | --- | --- |
| Penetration | 35 – 50 | 34 – 38 |
| Softening Point | 54 – 59° C. | 95° C. |
| Brittle Point | −6° C. | −12° C. |

The reaction product treated with 5 percent of zirconium tetrachloride corresponds, according to its penetration value, to a bitumen B 25, but exhibits substantially more favorable other properties.

| | Bitumen B 25 | Bitumen B 200 Treated with 5% of ZrCl₄ |
| --- | --- | --- |
| Penetration | 20 – 30 | 20 – 30 |
| Softening Point | 59 – 67° C. | 95° C. |
| Brittle Point | −2° C. | −14° C. |

EXAMPLE 5

100 g. of a blended bitumen B 500, which is soft at room temperature, is heated to 120° C., and 10 percent of an additive set forth in the table is mixed therewith. During the mixing step (5 minutes) the temperature is increased to 140°–150° C. in order to maintain the bitumen in an agitatable condition. Thereafter, the mixture is cooled to room temperature.

| Additive | Penetration | Softening Point |
| --- | --- | --- |
| H₂SO₄ | | 150° C. |
| AlCl₃ | | 121° C. |
| VCl₄ | 14 – 16 | 102° C. |
| TiCl₄ | 15 – 18 | 100° C. |
| VOCl₃ | 18 – 20 | 99° C. |
| Comparison bitmen: (Bitumen B 15) | 10 – 20 | 67–72° C. |

EXAMPLE 6

100 g. of a distillation tar (soft at room temperature) is mixed within a 6 minute period at 120° C. with 10 g. of sulfuric acid. After cooling, the softening point of the treated tar is 90° C. If the distillation tar is heated without additive for 6 minutes to 120° C., its softening point is only 10° C.

EXAMPLE 7

100 g. of a blown bitumen 75/30 (softening point 72° C.) is mixed, in accordance with Example 1, with 10 percent of sulfuric acid. The product has a softening point of 155° C.

EXAMPLE 8

Bitumen B 300 with a softening point of 32° C. is treated as described in Example 1 with 10 percent of one of the additives set forth in the table below, which also gives the softening points of the treated bitumen.

| Additive | Softening Point |
| --- | --- |
| AlCl₃ | 98° C. |
| VOCl₃ | 105° C. |
| TiCl₄ | 112° C. |
| VCl₄ | 115° C. |
| H₂SO₄ | 135° C. |

After the treatment with, for example, 10 percent of VCl₄, the penetration value is 22. The acidic additives cannot be detected in the treated bitumen by titration with sodium hydroxide solution.

EXAMPLE 9

The following bitumens are treated as described in Example 1 with 5 percent of $H_2SO_4$ or with 5 percent of $TiCl_4$, respectively.

| Bitumen | Softening Points Without Additive | Treated With 5% $H_2SO_4$ | Treated With 5% $TiCl_4$ |
|---|---|---|---|
| B 80 | 47° C. | 118° C. | 100° C. |
| Ebano 80* | 67° C. | 120° C. | 120° C. |
| B 45 | 55° C. | 108° C. | 115° C. |
| B 25 | 66° C. | 120° C. | 130° C. |

* Trademark

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for raising the softening point without adversely increasing the rupture point of a nondistillable, chemically unmodified, normally solid bitumen residue of crude oil refining having a softening point of 20° to 120° C. and selected from the group consisting of primary bitumens, high vacuum bitimens, bituminous coal tars, blown bitumens and blends thereof, which comprises:
   a. heating said bitumen to a temperature of 20°–150° C., said temperature being sufficiently above the softening point of the bitumen to lower the viscosity thereof;
   b. uniformly admixing said heated bitumen with 0.1 – 20 percent by weight of a reactant selected from the group consisting of concentrated sulfuric acid, $TiCl_4$, $AlCl_3$, $VOCl_3$, $VCl_4$ and $ZrCl_4$ for a period of time of 1 to 30 minutes sufficient to increase the ring and ball softening point of said bitumen by at least 5° C. and to increase the penetration indentation hardness values without adversely increasing the rupture point according to Fraass; and
   c. recovering a homogeneous bitumen characterized by retaining said increased softening point upon subsequent treatment at high temperatures with water, steam, sodium hydroxide solution or a soda solution.

2. A process according to claim 1 wherein a mixture of bitumen and a member selected from the group consisting of $TiCl_4$, $AlCl_3$, $VOCl_3$, $VCl_4$ and $ZrCl_4$ is heated for 5–10 minutes at 60°–150° C.

3. A process according to claim 1 wherein a mixture of bitumen and concentrated sulfuric acid is heated for 1 to 6 minutes at 60°–150° C.

4. A process according to claim 1 wherein the bitumen is heated to between 100° and 150° C.

5. A process according to claim 4 wherein the starting bitumen has a softening point below 90° C.

6. A process according to claim 5 wherein the starting bitumen has a softening point below 45° C.

7. A process according to claim 1 wherein the bitumen is treated with 1–10 percent by weight of said reactant.

8. A process according to claim 7 wherein the bitumen is heated at between 100°–150° C.

9. A process according to claim 1 wherein a bitumen having a softening point below 90° C. is heated with 1–10 percent by weight of concentrated sulfuric acid for 1 to 6 minutes at 100°–150° C.

10. A process according to claim 9 wherein a bitumen having a softening point below 45° C. is heated with a 5–10 percent by weight of concentrated sulfuric acid.

11. A process according to claim 1 wherein a bitumen having a softening point below 90° C. is heated with 1–10 percent by weight of a reactant selected from the group consisting of $TiCl_4$, $AlCl_3$, $VOCl_3$, $VCl_4$ and $ZrCl_4$ for from 5–10 minutes at 100°–150° C.

12. A process according to claim 1 wherein a bitumen having a softening point below 45° C. is heated with 5–10 percent by weight of said reactant.

13. A process according to claim 12 wherein the reactant is $TiCl_4$.

14. A process according to claim 1, wherein said bitumen is a primary bitumen selected from the group consisting of B-300, B-200, B-80, B-65, B-45, B-25 and B-15.

15. A process according to claim 1, wherein said bitumen is a blown bitumen selected from the group consisting of 75/30, 85/40, 105/15, 115/15 and 135/10.

16. A process according to claim 14, wherein said bitumen is a high vacuum bitumen selected from the group consisting of HVB-85/95, HVB-95/105 and HVB-130/140.

17. A process according to claim 1, wherein said bitumen is the bitumen blend BV500.

18. A process according to claim 1, wherein said bitumen is admixed with said reactant for a time of 1 to 10 minutes.

* * * * *